(12) United States Patent
Krohn et al.

(10) Patent No.: US 8,726,984 B2
(45) Date of Patent: May 20, 2014

(54) ROTARY TABLE DEVICE FOR A PIPE STRING

(75) Inventors: Helge Krohn, Sandnes (NO); Ove Kalvatn, Stavanger (NO); Mads Grinrød, Stavanger (NO); Odd B. Skjaerseth, Stavanger (NO)

(73) Assignee: West Drilling Products AS (NO)

( * ) Notice: Subject to any disclaimer, the term of this patent is extended or adjusted under 35 U.S.C. 154(b) by 0 days.

(21) Appl. No.: 13/575,260

(22) PCT Filed: Jan. 25, 2011

(86) PCT No.: PCT/NO2011/000027
§ 371 (c)(1),
(2), (4) Date: Oct. 4, 2012

(87) PCT Pub. No.: WO2011/093715
PCT Pub. Date: Aug. 4, 2011

(65) Prior Publication Data
US 2013/0014937 A1    Jan. 17, 2013

(30) Foreign Application Priority Data
Jan. 26, 2010    (NO) .................................... 20100125

(51) Int. Cl.
*E21B 3/04*    (2006.01)
(52) U.S. Cl.
USPC ....... 166/78.1; 166/77.51; 166/85.1; 175/195
(58) Field of Classification Search
USPC .................... 166/78.1, 77.51, 85.1, 379, 377; 175/195, 423
See application file for complete search history.

(56) References Cited

U.S. PATENT DOCUMENTS

| 2,405,757 | A |   | 8/1946  | Rowland |           |
|-----------|---|---|---------|---------|-----------|
| 2,595,434 | A | * | 5/1952  | Williams | 166/78.1 |
| 4,348,920 | A | * | 9/1982  | Boyadjieff | 81/57.25 |
| 4,979,356 | A |   | 12/1990 | Vatne   |           |

FOREIGN PATENT DOCUMENTS

NO        323330 B1    3/2007

OTHER PUBLICATIONS

International Search Report for parent application PCT/NO2011/000027, having a mailing date of Apr. 1, 2011.
Written Opinion for parent application PCT/NO2011/000027, having a mailing date of Apr. 1, 2011.

* cited by examiner

*Primary Examiner* — Giovanna Wright
*Assistant Examiner* — Taras P Bemko
(74) *Attorney, Agent, or Firm* — Andrus Intellectual Property Law, LLP

(57) ABSTRACT

A rotary table device is provided with means arranged for suspension of a pipe string. The rotary table comprises a rotary ring arranged rotatably about the central axis of the rotary table. The rotary ring is formed by two or more ring sections, each connected to a system comprising a bearing housing section rotatable relative to a base section, a bearing housing groove being formed in a base contact surface on the bearing housing section and a corresponding base groove being formed in an opposing bearing housing surface in the base section. The grooves form a curve-shaped track for a roller body and the groove has a curvature center coinciding with the central axis of the rotary table. The rolling diameter of the roller body exceeds the collective depth of said grooves, and a channel connecting the end portions of the bearing housing groove is formed in the bearing housing section.

21 Claims, 3 Drawing Sheets

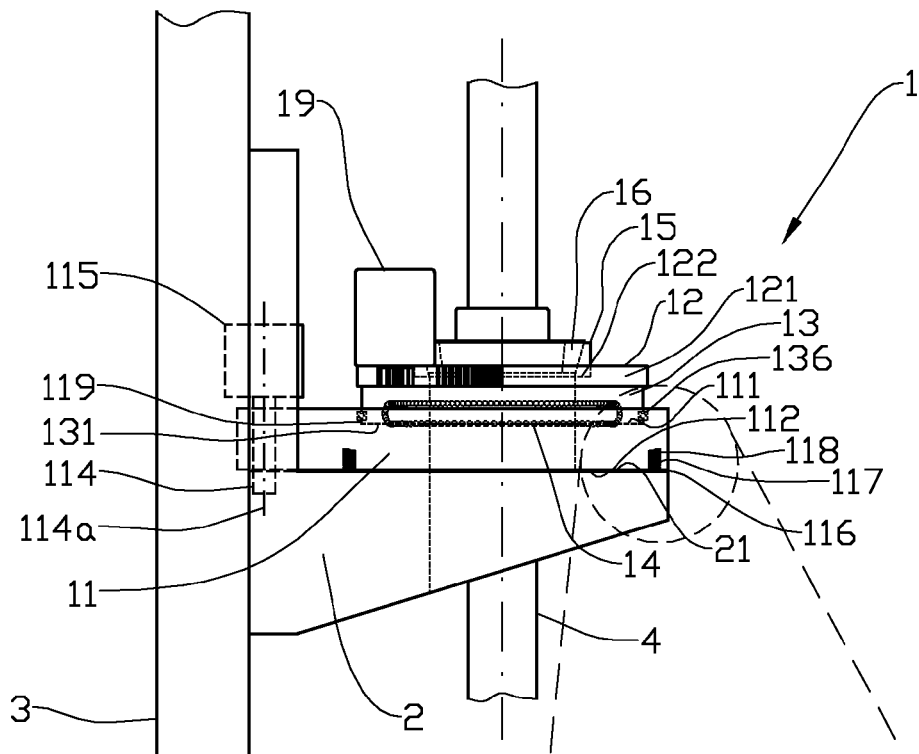
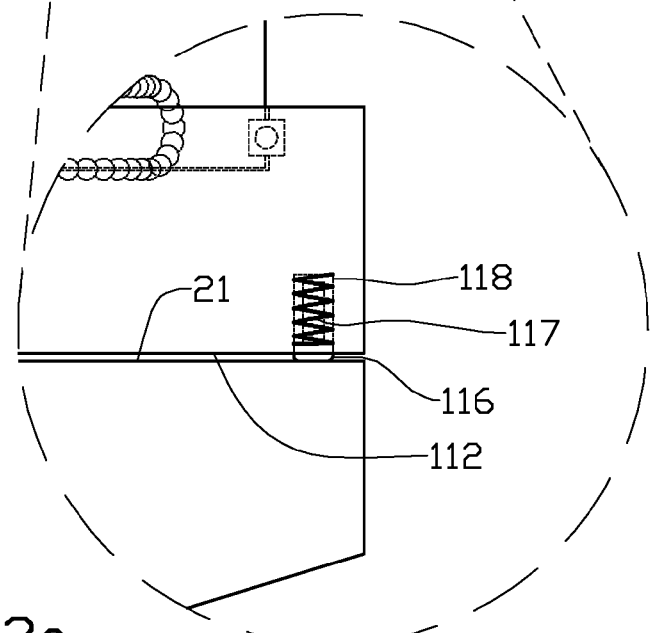
Fig. 3
Fig. 3a

IV-IV

ROTARY TABLE DEVICE FOR A PIPE STRING

CROSS-REFERENCE TO RELATED APPLICATIONS

This application is the U.S. national stage application of International Application No. PCT/NO2011/000027, filed Jan. 25, 2011, which International application was published on Aug. 4, 2011 as International Publication No. WO 2011/093715 A1 in the English language and which application is incorporated herein by reference. The International application claims priority of Norwegian Patent Application No. 20100125, filed Jan. 26, 2010, which application is incorporated herein by reference.

BACKGROUND

There is described a device for a rotary table provided with means arranged for suspension of a pipe string, the rotary table comprising a rotary ring arranged rotatably about the central axis of the rotary table, the rotary ring more particularly being formed by two or more ring sections, each connected to a system comprising an upper ring support section that in a first embodiment functions as a bearing housing section being rotatable relative to a base section, a bearing housing groove being formed in a base contact surface on the bearing housing section and a corresponding base groove being formed in an opposing bearing contact surface in the base section, said groove having a curve centre coinciding with the central axis of the rotary table, and the rolling diameter of the roller body exceeding the collective depth of said groove, and a channel connecting the end portions of the bearing housing groove being formed in the bearing housing section.

While using a rotary table for suspension and rotation of a pipe string, such as a drill string, where the rotary table typically constitutes the driving element in a drilling machine arranged displaceably in a rig derrick or the like in such a manner that the drilling machine is displaced vertically as the drill string works its way downward in the borehole, there is a need to be able to open the rotary table so that the drilling machine may be pulled away from the pipe string and be displaced vertically to be made ready for another operation. This is particularly relevant in a continuous drilling operation where several drilling machines cooperate in building and rotating the pipe string. In such divisibility it is complicated to provide a sufficiently powerful and functional supporting of the divisible rotary table in a divisible base when the rotary table shall be able to carry a pipe string weight of several hundred tonnes.

From WO 323330 is known a power tong comprising two mutually revolving housing halves, as the housing halves are arranged to be able to be rotated between a closed, active position and an open inactive position, and where a radially split drive ring provided with hydraulically activated clamping jaws directed toward the power tong central axis, is positioned in the housing halves, the drive ring being supported in and connected to a drive motor for rotation of the drive ring about said axis, and the drive ring being provided with at least one locking organ arranged for being able to tie the drive ring parts lockably together.

SUMMARY

The object of the invention is to remedy or reduce at least one of the disadvantages of the prior art, or at least to provide a useful alternative to the prior art.

The object is achieved by the features disclosed in the below description and in the subsequent claims.

There is provided a rotary table constituted by two essentially equal rotary table sections each attached in a frame pivotally supported about a pivotal axis parallel to a central axis through a central opening in the turning table. When the rotary table is closed, the rotary table sections are brought together forming a ring shaped body, and when the rotary table is open, there is formed an opening from the rotary table centre to its periphery, as the opening is suited for radial displacement of a pipe relative to the rotary table central opening into or out of the rotary table.

Each rotary table section comprises a base section, a ring section and also an upper ring support section. In alternate embodiments the base section or the upper ring support section function as a bearing housing section. In a first embodiment, the upper ring support section, functioning as the bearing housing section is provided with one or more horizontal, countersunk, continuous grooves that are arc-shaped having their curve centre coincident with the rotary table's central opening and stretching through an essential part of the sector formed by the ring section. Equivalently, corresponding rolling track(s) are arranged in an opposing surface in the base section. Together two opposing grooves form a rolling track for a rotary body, typically a ball, and exhibits a profile corresponding to the shape of the rotary body. Equivalently the corresponding return channel(s) are arranged enclosed in the bearing housing section and is in each end connected to said grooves by means of a first and a second, vertical, arc-shaped transition channel in such a manner that said grooves, transition channels and return channel form a continuous rolling track loop arranged for receiving a series of rotary bodies, as these in turning of the bearing housing section relative to the base section roll in the opposing grooves of the base section and the bearing housing section until they reach the end of the groove and move into the first transition channel, into the return channel and back to the groove through the second transition channel, as the roller bodies during the return travel are pushed forward as needed by succeeding roller bodies on their way from the groove into the return channel. The number of roller tracks depends on the size of rotary bodies employed and the size of the load the rotary table shall be able to carry.

The invention relates more particularly to a device for a rotary table provided with means arranged for suspension of a pipe string, where the rotary table comprises a rotary ring arranged revolving about the rotary table central axis, characterised in that the rotary ring is formed from two or more ring sections, each connected to a system comprising in one embodiment an upper ring support section functioning as a bearing housing section being rotatable relative to a base section, a bearing housing groove being formed in a base contact surface on the bearing housing section and a corresponding base groove being formed in the opposing bearing contact surface in the base section, said groove forming an arc-shaped track for a roller body and said track having a centre of curvature coincident with the rotary table's central axis, and the roller body rolling diameter exceeding the collective depth of said groove, and a channel connecting the end portions of the bearing housing groove being formed in the bearing housing section.

The channel may be provided with lead portion protruding downward into the base groove. Thereby the roller bodies are more easily guided into the return channel.

The roller body may have the shape of a ball. The same dimension of the roller body may thereby be used independently of the distance of the grooves from the rotary table central axis.

At least one ring section and the appurtenant base section may form a rotary table section being displaceable between a first position where the rotary table is radially closed and a second position where there in the rotary table is provided a radial pipe string opening.

Each ring section may have a drive unit connected to it. The ring sections are thereby exposed to a more even loading during rotation.

The rotary table may comprise two rotary table sections rotatably supported in a frame. The radial pipe string opening is thereby provided in an uncomplicated manner.

The rotary table sections may be supported on a contact face arranged in the frame perpendicularly to the rotary table central axis. The supporting function is thereby essentially provided by a static element, and elements providing the rotary table sections opening and closing functions, may thereby be made having smaller dimensions.

The element contacting the frame contact surface, and/or the frame is provided with a series of resilient sliding shoes which, when the rotary table is unloaded, is arranged to be able to maintain a clearance between the contact surface and an opposing end surface on the base section, each sliding shoe being resiliently supported in a recess in said element, or possibly in the frame, and protruding from the end surface of the element, respectively from the contact surface.

The bearing housing section may be arranged above the base section. Alternatively the bearing housing section may be arranged below the base section. This gives greater flexibility, particularly when the rotary table is provided with multiple bearing systems, for example to make override running of a pipe string possible during rotation.

BRIEF DESCRIPTION OF THE DRAWINGS

In the following is described an example of a preferred embodiment illustrated in the accompanying drawings, wherein:

FIG. 3 shows a side view of a first embodiment of the rotary table in a closed position, where an upper ring support section functions as a bearing housing;

FIG. 3a shows an enlarged detail of FIG. 3;

DETAILED DESCRIPTION OF THE DRAWINGS

Figure 1:
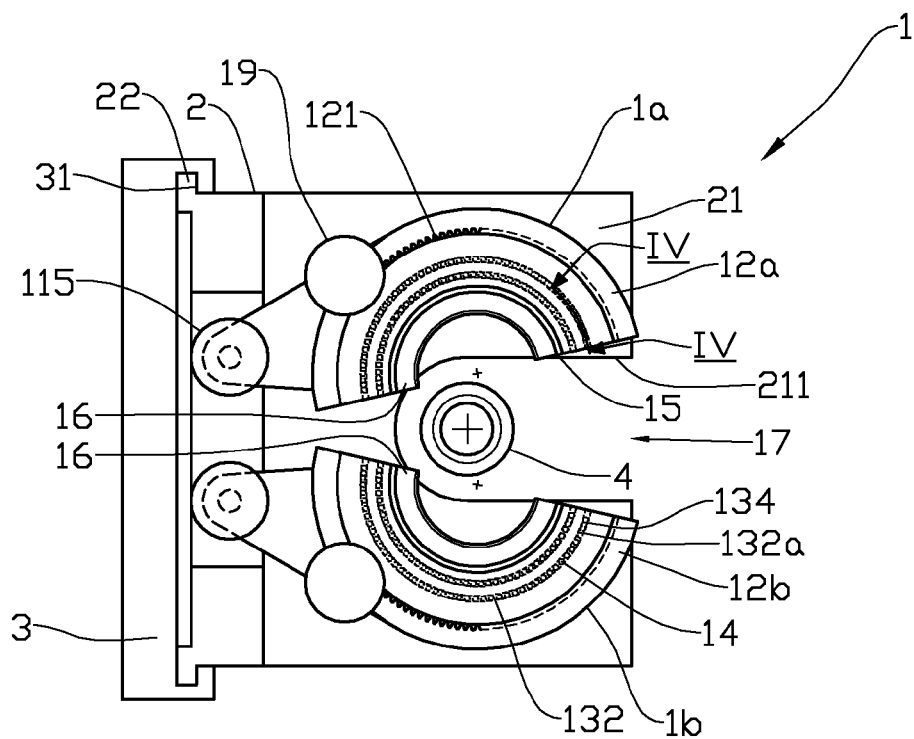
FIG. 1 shows a top view of a rotary table according to the invention in an open position.

In the figures the reference numeral 1 indicates a rotary table attached to and supported by a frame 2. The frame 2 is attached to a vertical derrick 3 typically projecting up from a drill floor (not shown) in a drilling rig (not shown). The frame 2 is connected to the derrick 3 by means of multiple connectors 22 and may be displaced in the vertical direction along sliding surfaces 31 arranged on the derrick. The rotary table 1 is provided with an axial pipe string opening 18 arranged for receiving a pipe string 4 of per se known type.

The rotary table 1 comprises, in the first embodiment example (see particularly FIGS. 1 and 2) two rotary table sections 1a, 1b each provided with a base section 11 attached in the frame by means of a swivel 114, as the rotary table sections 1a, 1b are pivotal about a pivot axis each 114a by means of a pivot actuator 115. The base section may be displaced in the direction of the pivot axis 114a.

The base section 11 is supported on a contact surface 21 arranged perpendicularly to the rotation axis 114a. Multiple sliding shoes 116 are arranged in recesses 118 in the base section 11 as they are arranged to be pushed out from an end surface 112 toward the contact surface 21 by means of a spring 117. In the unloaded position the rotary table sections 1a, 1b will rest against the frame 2 on the sliding shoes 116 only, the base section 11 end surface 112 being lifted clear of the contact surface 21 by means of the sliding shoes 116 and their springs 117. When the rotary table sections 1a, 1b are loaded, the base section 11 end surface 112 will abut the base contact surface 21, as the sliding shoes 116 are pushed into their respective recesses 118.

The contact surface 21 is provided with a recess 211 (see FIG. 1) extending from an outer edge and inward toward the rotary table centre and forming together with the rotary table sections 1a, 1b a radial pipe string opening 17 when the rotary table sections 1a, 1b are moved away from each other.

A bearing contact surface 111 is arranged recessed in the upper portion of the base section 11 and is defined by a side wall 119 and a central opening (not shown) that constitutes a portion of the axial pipe string opening 18. The bearing surfaces 111 of the base sections 11 of the two rotary table sections 1a, 1b and adjacent side wall 119 form, in the condition where they are pushed together, a cylindrical recess housing two semi-cylindrical upper ring support sections 13 functioning as bearing housings in a first embodiment being radially supported by multiple support bearings 136 arranged in connection with the side walls 119.

The upper ring support sections 13 are ring-shaped; forming, in the condition where they are pushed together, a portion of the axial pipe string opening 18 in the rotary table 1.

The upper ring support sections 13 are attached to each ring section 12a and 12b respectively, which, in the state where they are pushed together, form a cylindrical rotation ring 12 constituting a portion of the axial pipe string opening 18 in the rotary table 1. The ring sections 12a, 12b are each provided with a recess 122 arranged for receiving a wedge abutment 15 and a wedge belt section 16.

In a base contact surface 131 on the upper ring support sections 13 is arranged multiple parallel, arc-shaped grooves 132 concentrically with the central axis of the upper ring support sections 13. The end portions 132a of the grooves 132 are spaced apart from the radially arranged side edges of the base contact surfaces 131. Parallel to the grooves 132 is extending a return channel 133 through the upper ring support section 13, the return channel 133 having a cross-section larger than the cross-section of a roller body 14 and which in each end is connected with said groove 132 by means of an arc-shaped transition portion 134 leading into the ends of the respective grooves 132.

In the bearing contact surfaces 111 of the base sections 11 are arranged grooves 113 that are complementary to the grooves 132 in the opposing base contact surfaces 131 on the upper ring support section 13. The grooves extend to the radially arranged side edges of the bearing contact surfaces 111.

A guide portion 135 protrudes downward into the base section 11 groove 113 forming an extension of the outer periphery of the transition portion 134.

The grooves 113, 132 form a rolling track for a series of roller bodies 14, as the collective depth of the grooves is less than the roller body 14 diameters. When several roller bodies 14 are placed in their grooves 113, 132 the upper ring support section 13 will have a clearance to the base section 11 and roll on the roller bodies 14 which, when they have moved to the end of the groove 113 in the base section 11, are directed into the return channel 133 via the transition portion 134. The roller bodies 14 form a continuous line in the grooves 113, 132 and the return channel 133 as they are driven forward in the grooves 113, 132 at the rotation of the upper ring support section 13 relative to the base section 11 until they meet with the guide portion 135 and are directed into the transition portion 134 and the return channel 133 as the roller bodies here are pushed forward by continuous feeding of new roller bodies 14.

Each rotary table section 1a, 1b is provided with a rotary drive unit 19 engaged with a sectioned gear rim 121 arranged on the ring sections 12a, 12b.

In the closed state (see FIG. 2) the upper ring support sections 13 forming a cylindrical body, may rotate continuously, as the base sections 11 form continuous, ring-shaped grooves 113, while the roller bodies 14 are directed into the return channel 133 via the transition portion 134 when the roller bodies 14 meet the guide portion 135 protruding into the base groove 113.

Figure 2:
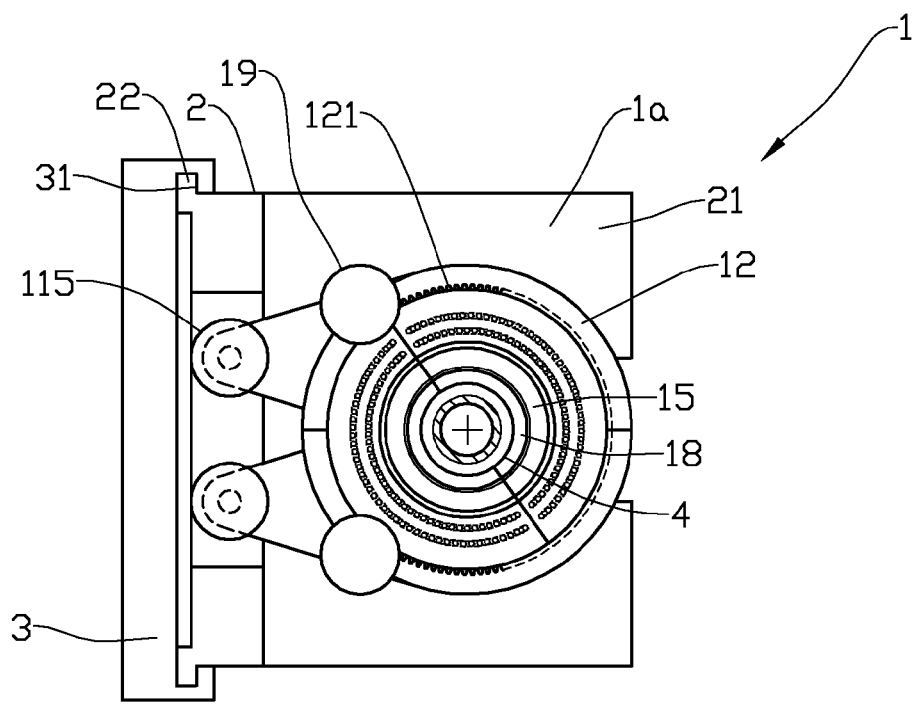
FIG. 2 shows a top view the rotary table in a closed position.
Figure 4:
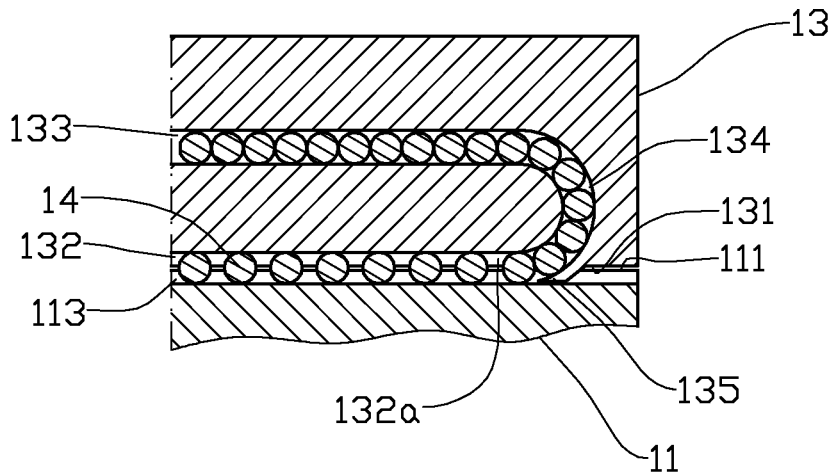
FIG. 4 shows in a larger scale a vertical section IV-IV in FIGS. 1 and 3 through a portion of the bearing housing section and the base section.

When the rotary table 1 is to be opened to be able to be drawn away from the pipe string 4, the ring sections 12a, 12b are rotated to an initial position wherein they are flush with their respective base section 11, so that the rotary table sections 1a, 1b form an essentially plane interface against each other, as is shown in FIG. 1. It is obvious to provide the rotary table 1 according to the invention with means safeguarding that the rotary table sections 1a, 1b are not shifted away from each other unless the ring sections 12a, 12b are in their initial positions.

Even if in the preceding is described and shown roller bodies 14 being ball-shaped, this does not exclude the use of other forms of rotary bodies, such as conical rollers having a cone angle corresponding to the radius of the rolling track 113, 132.

The sliding shoes 116 are shown here inlaid in the base sections 11, but it is clear that being inlaid in the frame 2 where the glide shoes 116 extend upward toward the base sections 11 will provide the same resilient support as described above.

It is obvious to provide the surface 21, 112 whereon the sliding shoes slide, with replaceable sliding tracks (not shown).

Even if in the preceding is shown two half cylindrical ring sections 12a, 12b with corresponding base sections 11 rotatable about vertical rotary axes 114a, a radial pipe string opening 17 may be provided in other ways, for example by opening and closing a C-shaped ring section (not shown) by a completing ring section (not shown) is displaced in a radial direction in and out of the C-shaped ring section opening, to thereafter being displaced away from the opening sector outside the periphery of the C-shaped ring section.

Figure 5:
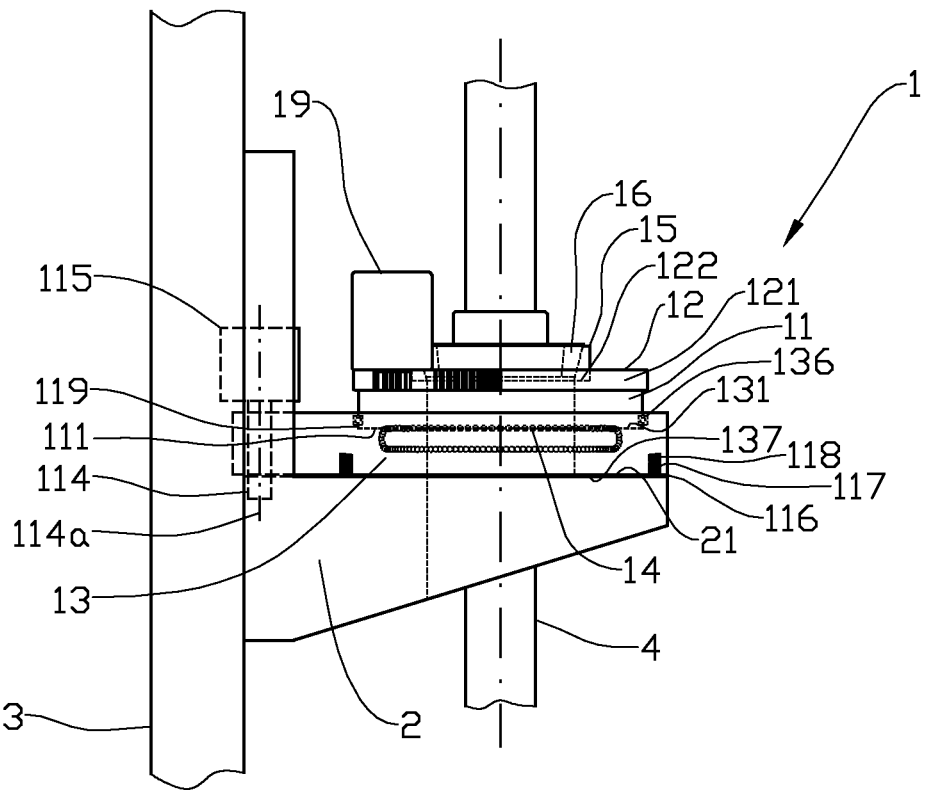
FIG. 5 shows a side view of a second embodiment of a rotary table in the closed position where the base section functions as the bearing housing.

In the embodiment example described above and with reference to the FIGS. 1-4 the upper ring support sections 13 comprise the grooves that hold the roller bodies, and thus function as a bearing housing. In a second embodiment as is indicated in FIG. 5 the grooves are arranged in the base section (11) such that it functions as the bearing housing section. In such an embodiment said sliding shoes 116 are arranged in recesses 118 in a support surface 137 arranged in the upper ring support sections 13 and facing the frame 2 contact surface 21.

For a person skilled in the art it is also obvious to arrange the rotary table 1 according to the invention having a second bearing system (not shown) mirrored relative to and connected to that being described above for the rotary table 1 thereby to be able to apply to the pipe string 4 an axially downward force when the pipe string must be driven by force down into a bore hole in so-called "snubbing".

The invention claimed is:

1. A rotary table device, comprising:
a static frame that radially outwardly extends from a vertical derrick at a fixed vertical position, the static frame having a horizontally planar upper contact surface that extends radially outwardly to an outer edge, the outer edge defining a radially inwardly extending recess that defines part of a radial pipe string opening for receiving a pipe string;
a rotary table supported on the upper contact surface of the frame, the rotary table having rotary table sections that are pivotable with respect to the upper contact surface between an open position for receiving the pipe string and a closed position for enclosing and rotating the pipe string;
each rotary table section comprising a base section, a semi-circular ring section and an upper ring support section that is disposed between the base section and the semi-circular ring section;
wherein the base section comprises a lower end surface that faces the upper contact surface of the frame and an oppositely-oriented upper bearing contact surface;
the rotary table being vertically movable with respect to the frame between a loaded position wherein the lower end surface abuts the upper contact surface and an unloaded position wherein the lower end surface is lifted clear of the upper contact surface;
wherein the upper ring support section has a base contact surface in which is formed at least one arc-shaped groove; and
a plurality of roller bodies disposed in the groove in the base contact surface;
wherein in the upper bearing contact surface of the base section are formed at least one arc-shaped groove that aligns with the groove in the base contact surface so as to also receive the plurality of roller bodies; and
wherein when the rotary sections are in the closed position, the grooves in the base contact surface and in the upper bearing contact surface together define a circular rolling track for the plurality of roller bodies; wherein when the upper ring support section is rotated with respect to and supported by the base section, the upper ring support section rolls on the roller bodies.

2. The rotary table device according to claim 1, wherein the groove in the base contact surface is one of a plurality of arc-shaped grooves in the base contact surface and wherein the groove in the upper bearing contact surface is one of a plurality of arc-shaped grooves in the upper bearing contact surface and wherein when the rotary sections are in the closed position, the plurality of arc-shaped grooves in the base contact surface and in the upper bearing contact surface together define a plurality of circular rolling tracks for the plurality of roller bodies.

3. The rotary table device according to claim 2, further comprising a plurality of return channels that receive the plurality of roller bodies from the plurality of circular rolling tracks via respective transition portions so that the roller bodies travel around the plurality of circular rolling tracks.

4. The rotary table device according to claim 3, comprising guide portions directing the plurality of roller bodies from the plurality of circular rolling tracks to the transition portions.

5. The rotary table device according to claim 4, wherein the transition portions are arc-shaped and extend between the guide portions and the plurality of return channels.

6. The rotary table device according to claim 3, wherein the plurality of arc-shaped grooves in the base contact surface receives the plurality of roller bodies from the plurality of return channels.

7. The rotary table device according to claim 6, wherein the plurality of return channels are enclosed inside of the upper ring support section so as to form a circuitous internal path from a first end of the plurality arc-shaped grooves in the base contact surface to a second, opposite end of the plurality arc-shaped grooves in the base contact surface.

8. The rotary table device according to claim 7, wherein the plurality of roller bodies are continuously moved along the plurality of rolling tracks and through the plurality of return channels when the upper ring support section rolls on the roller bodies with respect to the base section.

9. The rotary table device according to claim 3, wherein the plurality of arc-shaped grooves in the upper bearing contact surface receives the plurality of roller bodies from the plurality of return channels.

10. The rotary table device according to claim 9, wherein the plurality of return channels are enclosed inside of the base section so as to form a circuitous internal path from a first end of the plurality arc-shaped grooves in the upper bearing contact surface to a second, opposite end of the plurality arc-shaped grooves in the upper bearing contact surface.

11. The rotary table device according to claim 10, wherein the plurality of roller bodies are continuously moved along the rolling track and through the return channels when the upper ring support section rolls on the roller bodies with respect to the base section.

12. The rotary table device according to claim 2, comprising a drive unit for driving each rotary table section into rotation.

13. The rotary table device according to claim 12, wherein the drive unit engages a sectioned gear rim on the semi-circular ring section.

14. The rotary table device according to claim 2, wherein each groove in the plurality of arc-shaped grooves in the upper bearing contact surface has ends that are spaced apart from a radially arranged side edge of the upper bearing contact surface.

15. The rotary table device according to claim 2, wherein each groove in the plurality of arc-shaped grooves in the base contact surface extends to radially-arranged side edges of the base contact surface.

16. The rotary table device according to claim 2, wherein the semi-circular ring sections define recesses for receiving a wedge abutment and a wedge belt section.

17. The rotary table device according to claim 2, comprising a plurality of sliding shoes that support the rotary table apart from the frame in the unloaded position and that slide along the upper contact surface when the rotary table sections are pivoted with respect to the upper contact surface between the open position and the closed position.

18. The rotary table device according to claim 17, comprising springs that are disposed in recesses formed in the lower end surface of the base section and that bias the sliding shoes out of the recesses when the rotary table is in the unloaded position.

19. The rotary table device according to claim 18, wherein the sliding shoes are pushed into the recesses against the bias of the springs when the rotary table is in the loaded position.

20. The rotary table device according to claim 2, wherein the base section is pivotably coupled to the frame.

21. The rotary table device according to claim 2, wherein the upper bearing contact surface defines a recess for receiving the upper ring support section.

* * * * *